United States Patent
Umar et al.

(10) Patent No.: US 9,670,421 B2
(45) Date of Patent: Jun. 6, 2017

(54) SEPARATION PROCESS AND APPARATUS

(71) Applicant: UOP LLC, Des Plaines, IL (US)

(72) Inventors: Syed Basheer Umar, Chennai (IN); Raul Zavala, Chicago, IL (US); Paolo Palmas, Des Plaines, IL (US); Richard A. Johnson, II, Algonquin, IL (US)

(73) Assignee: UOP LLC, Des Plaines, IL (US)

( * ) Notice: Subject to any disclaimer, the term of this patent is extended or adjusted under 35 U.S.C. 154(b) by 196 days.

(21) Appl. No.: 14/458,392

(22) Filed: Aug. 13, 2014

(65) Prior Publication Data

US 2016/0046883 A1   Feb. 18, 2016

(51) Int. Cl.

| | |
|---|---|
| *B01D 45/12* | (2006.01) |
| *C10G 11/18* | (2006.01) |
| *B01D 45/16* | (2006.01) |
| *B01D 45/08* | (2006.01) |
| B01D 50/00 | (2006.01) |
| B04C 5/26 | (2006.01) |
| B04C 3/04 | (2006.01) |

(52) U.S. Cl.
CPC .............. *C10G 11/18* (2013.01); *B01D 45/08* (2013.01); *B01D 45/12* (2013.01); *B01D 45/16* (2013.01); *B01D 50/002* (2013.01); *B04C 3/04* (2013.01); *B04C 5/26* (2013.01)

(58) Field of Classification Search
CPC .. C10L 3/12; C10L 2290/544; C10L 2290/12; C10L 2200/0415; B04C 5/28; B04C 5/12; B04C 5/26; B04C 3/04; A47L 9/1641; A47L 9/1625; A47L 9/1683; B01D 45/16; B01D 45/12; B01D 50/002; B01D 45/08
See application file for complete search history.

(56) References Cited

U.S. PATENT DOCUMENTS

| | | | | |
|---|---|---|---|---|
| 2,859,168 | A | * 11/1958 | Downing | B04C 5/20 208/48 R |
| 2,916,438 | A | * 12/1959 | Jahnig | C10B 55/10 208/127 |
| 3,053,643 | A | * 9/1962 | Osborne | B01J 8/28 208/156 |
| 3,086,852 | A | * 4/1963 | Fenske | B01J 8/0469 208/109 |

(Continued)

FOREIGN PATENT DOCUMENTS

| | | |
|---|---|---|
| GB | 817127 A | 7/1959 |
| RU | 1603558 A1 | 3/1996 |

(Continued)

OTHER PUBLICATIONS

Search Report dated Sep. 24, 2015 for corresponding PCT Appl. No. PCT/US2015/037928.

(Continued)

*Primary Examiner* — Dung H Bui

(57) ABSTRACT

An apparatus and process is disclosed for mitigating coking in an FCC reactor plenum. The apparatus and process utilize a baffle to create a inner volume for the product vapors to prevent contact with a relatively cool plenum. The baffle also limits the amount of the time the product vapors spend in the plenum minimizing time for coke formation and limit product vapors from entering low fluidization zones.

20 Claims, 2 Drawing Sheets

(56) References Cited

U.S. PATENT DOCUMENTS

| | | | | |
|---|---|---|---|---|
| 3,254,476 A * | 6/1966 | Kusek | ............... | B01J 8/0055 208/161 |
| 3,767,566 A * | 10/1973 | Cartmell | ............... | B01J 8/1863 208/120.1 |
| 4,283,273 A * | 8/1981 | Owen | ............... | B01J 8/26 208/113 |
| 4,547,341 A * | 10/1985 | Weber | ............... | B01J 8/0055 248/317 |
| 4,687,497 A * | 8/1987 | Owen | ............... | B01D 45/12 422/147 |
| 4,702,891 A | 10/1987 | Li et al. | | |
| 4,725,410 A * | 2/1988 | Krug | ............... | C10G 11/18 422/144 |
| 4,778,660 A | 10/1988 | Haddad et al. | | |
| 4,789,458 A | 12/1988 | Haddad et al. | | |
| 4,927,527 A | 5/1990 | Haddad et al. | | |
| 4,933,150 A | 6/1990 | Haddad et al. | | |
| 5,009,853 A * | 4/1991 | Kovacs | ............... | C10G 11/182 422/144 |
| 5,584,985 A | 12/1996 | Lomas | | |
| 5,589,139 A | 12/1996 | Zinke et al. | | |
| 6,022,390 A | 2/2000 | Jakkula | | |
| 6,200,534 B1 | 3/2001 | Ruottu | | |
| 6,299,826 B1 | 10/2001 | Brent et al. | | |
| 6,503,460 B1 | 1/2003 | Miller et al. | | |
| 6,585,883 B1 * | 7/2003 | Kelemen | ............... | C10B 43/02 208/48 AA |
| 6,680,030 B2 | 1/2004 | Koebel et al. | | |
| 6,740,227 B2 | 5/2004 | Hedrick | | |
| 7,985,282 B2 | 7/2011 | Castagnos, Jr. et al. | | |
| 8,361,202 B2 | 1/2013 | Andreux et al. | | |
| 8,696,995 B2 | 4/2014 | Niccum et al. | | |
| 8,727,137 B1 * | 5/2014 | Blue | ............... | B01D 35/30 210/323.2 |
| 8,999,248 B1 * | 4/2015 | Sandacz | ............... | B01J 19/28 422/145 |
| 2002/0189452 A1 * | 12/2002 | Benham | ............... | B01D 45/12 95/269 |
| 2006/0094915 A1 * | 5/2006 | Palmas | ............... | B01J 8/0055 585/639 |
| 2007/0157807 A1 * | 7/2007 | Castagnos, Jr. | ............... | B04C 3/06 95/271 |
| 2009/0107336 A1 * | 4/2009 | Mehlberg | ............... | B01D 45/08 95/271 |
| 2010/0075829 A1 | 3/2010 | Lambin et al. | | |
| 2012/0103870 A1 | 5/2012 | Buchanan et al. | | |
| 2013/0001131 A1 | 1/2013 | Chen | | |
| 2013/0084219 A1 | 4/2013 | Tammera et al. | | |
| 2013/0118960 A1 * | 5/2013 | Tandon | ............... | B04C 5/28 210/95 |

FOREIGN PATENT DOCUMENTS

| | | |
|---|---|---|
| RU | 2385312 C2 | 3/2010 |
| WO | 0158568 A1 | 8/2001 |

OTHER PUBLICATIONS

Chen, "Stripper Technology—How to Get More Profits from FCC Units", NPRA Annual Meeting, Mar. 13-15, 2005, San Francisco, CA.

Jin, "Research and development of a new high-efficiency cyclone tube", Petroleum Processing and Petrochemicals (ISSN 1005-2399) V27 N.2 47-52 (Feb. 1996), v 27, n 2, p. 47-52, Feb. 1996; Language: Chinese.

Ma, "Flow Structure of New Quick-contact Cyclone reactor", Advanced Materials Research, vols. 396-398 (2012) pp. 1055-1058.

Mc Carthy, "Refiner improves FCC yields using latest process technologies", Oil & Gas Journal, Aug. 18, 1997, pp. 56-59.

Shi, "Development and Commercial Application of High-Efficiency New Multi-Tube Cyclones", Petroleum Refifnery Engineering, v 26, n 3, p. 28-31, May 25, 1996; Language: Chinese; ISSN: 1002106X; Publisher: Petrochem Eng Corp.

Vakhshouri, "Effects of the plenum chamber volume and distributor geometry on fluidized bed hydrodynamics", Particuology 8 (2010) 2-12.

U.S. Appl. No. 14/458,418, filed Aug. 13, 2014.

* cited by examiner

SEPARATION PROCESS AND APPARATUS

FIELD

The field relates generally to the separation of solid particles from gases. More specifically, the field relates to the separation of particulate catalyst materials from gaseous materials in an FCC process and apparatus.

BACKGROUND

A fluidized catalytic cracking (FCC) process is a process that cracks higher molecular weight hydrocarbons down to gasoline and liquefied petroleum gas (LPG) range hydrocarbons. The FCC process is carried out by contacting hydrocarbonaceous feed material such as vacuum gas oil, residual crude, or another source of relatively high boiling hydrocarbons with a catalyst made up of finely divided or particulate solid material in an elongated conduit. Contact of the feed with the fluidized catalyst particles catalyzes the cracking reaction while coke is deposited on the catalyst. Catalyst exiting the reaction zone is spoken of as being "spent"; i.e., partially deactivated by the deposition of coke upon the catalyst. Spent catalyst is conventionally transferred to a stripper that removes adsorbed and entrained hydrocarbon gases from catalyst and then to a regenerator for purposes of removing the coke by oxidation with an oxygen-containing gas. Regenerated catalyst is returned to the reaction zone. Oxidizing the coke from the catalyst surface releases a large amount of heat, a portion of which leaves the regenerator with the regenerated catalyst.

Spent catalyst still has catalytic activity. Prolonged contact between spent catalyst and cracked product gases can allow overcracking of desired products and additional coke deposition, thereby diminishing the recovery of desired product. Spent catalyst and gas products exiting the reactor conduit typically enter into a voluminous reactor vessel in which they may reside for prolonged times before separation, thereby allowing additional cracking to occur. Separation devices at the discharge end of the riser conduit have been used to quickly separate much of the catalyst and gaseous product.

Cyclones for separating particulate material from gaseous materials exiting the riser conduit or collected from the large reactor vessel are well known to those skilled in the art of FCC processing. Cyclones usually comprise an inlet that is tangential to the outside of a cylindrical vessel that forms an outer wall of the cyclone. In the operation of an FCC cyclone, the entry and the inner surface of the outer wall cooperate to create a spiral flow path of the gaseous materials and catalyst that establishes a vortex in the cyclone. The centripetal acceleration associated with an exterior of the vortex causes catalyst particles to migrate towards the outside of the barrel while the gaseous materials enter an interior of the vortex for eventual discharge through an upper outlet to a gas conduit. The heavier catalyst particles accumulate on the side wall of the cyclone barrel by centrifugal force and eventually drop to the bottom of the cyclone and out via a lower outlet into a catalyst bed.

The catalyst bed is typically fluidized to facilitate entry of the catalyst into a stripper vessel. The reactor vessel contains a large volume of empty space in which catalyst can become entrained with gaseous product that has not yet exited the reactor vessel. Entrainment can occur when catalyst is being transferred between separator stages, transferred from the cyclone dipleg into the catalyst bed and fluidized in the catalyst bed. Typically, the reactor vessel is purged with an inert gas, such as steam, to activate low fluidization zones and quicken the entry of product gases with entrained catalyst particles into the cyclones to eventually exit from the reactor vessel.

Gas conduits from multiple cyclones may all have outlet ends in a plenum located inside or outside the top of the reactor vessel. Product gases from the gas conduits exiting the cyclones collect in the plenum and eventually exit the reactor vessel or the plenum to be further refined.

Accordingly, it is an object of the present invention to improve the efficiency of separating particulate solids from vapors in an FCC unit.

SUMMARY

The apparatus and process utilize a baffle to create an inner volume for the product vapors to prevent contact with a relatively cool plenum. The baffle also limits the amount of time the product vapors spend in the plenum minimizing time for coke formation and limit product vapors from entering low fluidization zones.

In a process embodiment, the invention comprises a process for separating catalyst from gas comprising separating catalyst from product gas in a cyclone; removing product gas from the cyclone in a gas conduit into an inner volume in a plenum; discharging the product gas from the plenum through a plenum outlet; and distributing a purge gas into an outer volume in the plenum outside of the inner volume to purge gas from an outer volume.

In an additional process embodiment, the invention comprises a process for separating catalyst from gas comprising separating catalyst from product gas in a cyclone; removing product gas from the cyclone in a gas conduit into an inner volume in a plenum; discharging the product gas from the plenum through a plenum outlet; heating a purge gas; distributing the purge gas into an outer volume in the plenum outside of the inner volume to purge gas from an outer volume.

In a further process embodiment, the invention comprises a process for separating catalyst from gas comprising separating catalyst from product gas in a cyclone; removing product gas from the cyclone in a gas conduit into an inner volume in a plenum; discharging the product gas from the plenum through a plenum outlet; distributing a purge gas into an outer volume in the plenum outside of the inner volume to purge gas from an outer volume in the plenum; and passing the purge gas from the outer volume into the inner volume.

Additional details and embodiments of the invention will become apparent from the following detailed description of the invention.

DEFINITIONS

The term "communication" means that material flow is operatively permitted between enumerated components.

The term "downstream communication" means that at least a portion of material flowing to the subject in downstream communication may operatively flow from the object with which it communicates.

The term "upstream communication" means that at least a portion of the material flowing from the subject in upstream communication may operatively flow to the object with which it communicates.

The term "direct communication" means that flow from the upstream component enters the downstream component without undergoing a compositional change due to physical fractionation or chemical conversion.

The term "bypass" means that the object is out of downstream communication with a bypassing subject at least to the extent of bypassing.

As used herein, the term "T5" or "T95" means the temperature at which 5 volume percent or 95 volume percent, as the case may be, respectively, of the sample boils using ASTM D-86.

As used herein, the term "initial boiling point" (IBP) means the temperature at which the sample begins to boil using ASTM D-86.

As used herein, the term "end point" (EP) means the temperature at which the sample has all boiled off using ASTM D-86.

As used herein, the term "separator" means a vessel which has an inlet and at least two outlets.

As used herein, the term "predominant" or "predominate" means greater than 50 wt %, suitably greater than 75 wt % and preferably greater than 90 wt %.

As used herein, the term "a component-rich stream" means that the rich stream coming out of a vessel has a greater concentration of the component than the feed to the vessel.

DETAILED DESCRIPTION

Residue fluid catalytic cracking (FCC) units that process atmospheric residue feed have been observed to experience severe coking in a plenum of a reactor vessel. The coking is due to incomplete cracking of the oil feed into vapor products inside the riser. Some coking is fairly common in the plenum. However, severe coking means loss of vapor product for the refiner. In addition, the coking in the plenum will require major maintenance work in order to extract the coke from the FCC unit. Normally, FCC units do not have extended periods for maintenance work. Major coking in the plenum causes additional maintenance work that would otherwise be limited. The severe coking in the plenum can also lead to mechanical integrity issues between the plenum and the top head of the reactor vessel. The reactor vessel runs very hot, about 1000° F. (538° C.), and the various parts of the metal reactor vessel expand as necessary. As the reactor vessel cools and contracts during a shutdown for maintenance, the coked plenum may hinder the plenum and the top head from returning to their normal state causing additional stresses between the plenum and top head connections. The process and apparatus to be described is designed to prevent sever coking in the plenum.

Figure 1:
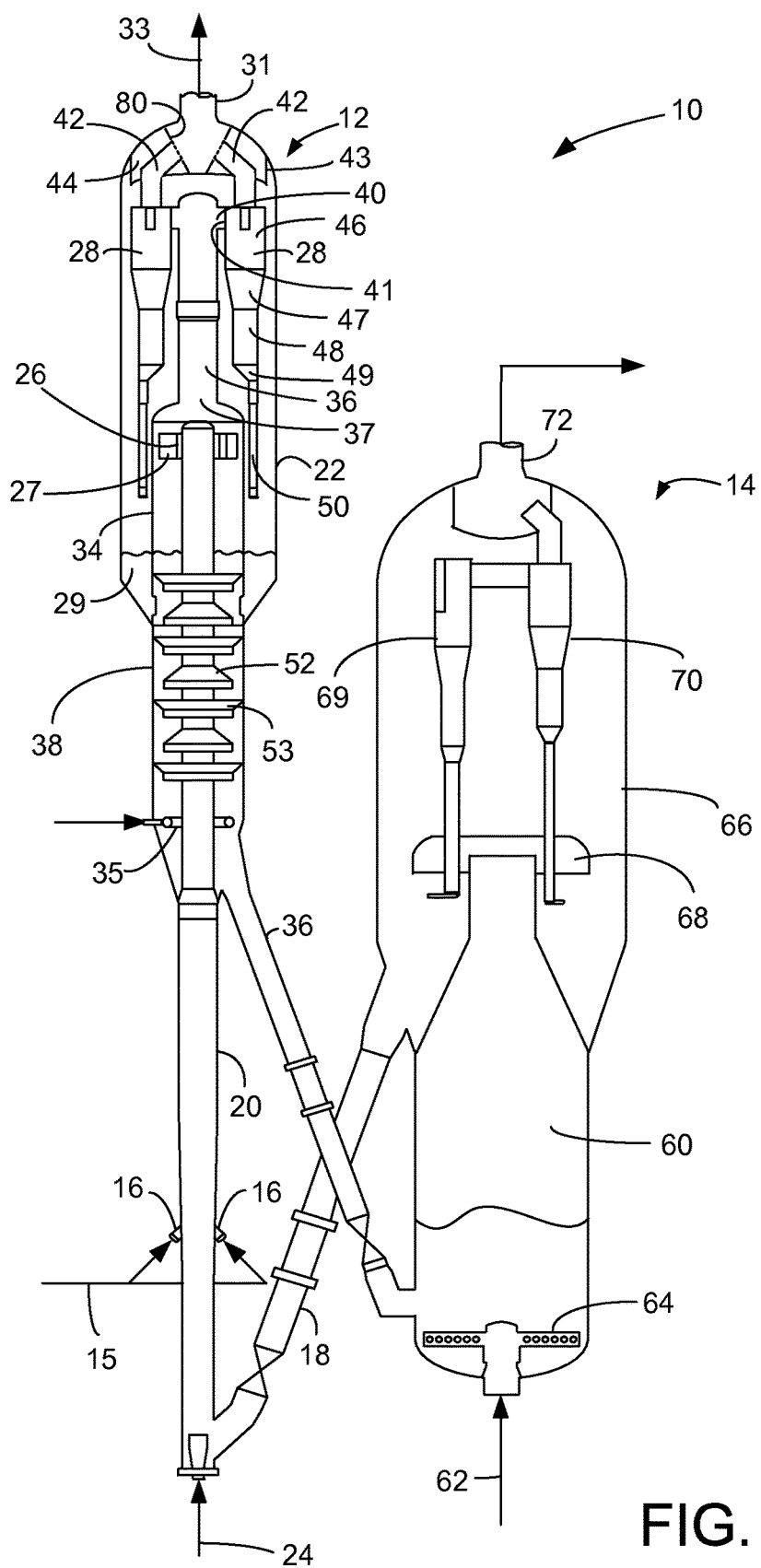
FIG. 1 is a schematic cross-sectional view of an FCC unit.

Now turning to FIG. 1, wherein like numerals designate like components, FIG. 1 illustrates a process and apparatus 10 for fluid catalytic cracking (FCC). The process and apparatus 10 includes a reactor 12 and a regenerator 14. Process variables typically include a cracking reaction temperature of 400° to 600° C. and a catalyst regeneration temperature of 500° to 900° C. Both the cracking and regeneration occur at an absolute pressure below 5 atmospheres.

In a typical FCC unit, a heavy hydrocarbon feed stream in a line 15 is distributed by distributors 16 into a riser 20 to be contacted with a newly regenerated cracking catalyst entering from a regenerator conduit 18. This contacting may occur in the narrow riser 20, extending upwardly to the bottom of a reactor vessel 22. The contacting of feed and catalyst is fluidized by gas from a distributor fed by a fluidizing gas line 24. Heat from the catalyst vaporizes the hydrocarbon feed, and the hydrocarbon feed is thereafter cracked to lighter molecular weight hydrocarbons in the presence of the catalyst as both are transferred up the riser 20 into the reactor vessel 22.

A conventional FCC feedstock and higher boiling hydrocarbon feedstock are suitable fresh hydrocarbon feed streams. The most common of such conventional fresh hydrocarbon feedstocks is a "vacuum gas oil" (VGO), which is typically a hydrocarbon material having a boiling range with an IBP of no more than about 340° C. (644° F.), a T5 between about 340° C. (644° F.) to about 350° C. (662° F.), a T95 between about 555° C. (1031° F.) and about 570° C. (1058° F.) and an EP of no less than about 570° C. (1058° F.) prepared by vacuum fractionation of atmospheric residue. Such a fraction is generally low in coke precursors and heavy metal contamination which can serve to contaminate catalyst. Atmospheric residue is a another suitable feedstock boiling with an IBP of no more than about 340° C. (644° F.), a T5 between about 340° C. (644° F.) and about 360° C. (680° F.) and a T95 of between about 700° C. (1292° F.) and about 900° C. (1652° F.) and an EP of no less than about 900° C. (1652° F.) obtained from the bottom of an atmospheric crude distillation column. Atmospheric residue is generally high in coke precursors and metal contamination. Other heavy hydrocarbon feedstocks which may serve as fresh hydrocarbon feed include heavy bottoms from crude oil, heavy bitumen crude oil, shale oil, tar sand extract, deasphalted residue, products from coal liquefaction, vacuum reduced crudes. Fresh hydrocarbon feedstocks also include mixtures of the above hydrocarbons and the foregoing list is not comprehensive.

The reactor riser 20 extends upwardly into a reactor vessel 22 as in a typical FCC arrangement. The reactor riser 20 preferably has a vertical orientation within the reactor vessel 22 and may extend upwardly through a bottom of the reactor vessel 22. The reactor vessel 22 may include a disengaging chamber 34.

In an aspect, the reactor riser 20 terminates in the disengaging chamber 34 at exits defined by the end of swirl arms 26. Each of the swirl arms 26 may be a curved tube that has an axis of curvature that may be parallel to a central longitudinal axis of the reactor riser 20. Each swirl arm 26 has one end in downstream communication with the reactor riser 20 and another open end comprising a discharge opening 27. The swirl arm 26 discharges a mixture of gaseous fluids comprising cracked product gas and solid catalyst particles through the discharge opening 27. Tangential discharge of product gases and catalyst from the discharge opening 27 produces a swirling helical motion about the cylindrical interior of the disengaging chamber 34. Centripetal acceleration associated with the helical motion forces the heavier catalyst particles to the outer perimeter of the disengaging chamber 34, lose momentum and fall. Catalyst particles from the discharge openings 27 collect in the bottom of the disengaging chamber 34 to form a dense catalyst bed 29. The gases, having a lower density than the solid catalyst particles, more easily change direction and begin an upward spiral. The disengaging chamber 34 includes a gas recovery conduit 36 with a lower inlet 37 through which the spiraling gases ultimately travel. The gases that enter the gas recovery conduit 36 through the inlet 37 will usually contain a light loading of catalyst particles.

The inlet 37 recovers gases from the discharge openings 27 as well as stripping gases from a stripping section 38 which may be located in the disengaging chamber 34 as is hereinafter described. The loading of catalyst particles in the gases entering the gas recovery conduit 36 is usually less than 16 kg/m$^3$ (1 lb/ft$^3$) and typically less than 3 kg/m$^3$ (0.2 lb/ft$^3$).

The gas recovery conduit 36 of the disengaging chamber 34 includes an exit or outlet 40 contiguous with an inlet 41 or entrance to one or more cyclones 28 that effect a further removal of catalyst particulate material from the gases exiting the gas recovery conduit 36 of the disengaging chamber 34. The cyclones may be directly connected to the gas recovery conduit 36 and the gas recovery conduit 36 may be in direct downstream communication with the disengaging chamber 34. Typically about 2-30 cyclones are contained in the reactor vessel 22, usually oriented in a circular configuration. Hence, substantially all of the gases and solids exiting the disengaging chamber 34 into the gas recovery conduit 36 enter the cyclones 32. Alternatively, it is also contemplated that cyclones have inlets open to the reactor vessel 22 instead of being in direct connection with the gas recovery conduit 36. In such case, the cyclones 28 would collect product gas and catalyst discharged from the riser 20 and ascending in the reactor vessel 22 for separation.

Cyclones 28 create a swirl motion therein to establish a vortex that separates solids from gases. A product gas stream, relatively free of catalyst particles, exits the cyclones 28 through gas conduits 42 into a fluid-sealed plenum 44. Each of a plurality of cyclones 28 has a gas conduit 42 that extends into the plenum 44, so the plenum 44 is in downstream, direct communication with each of the gas conduits 42. The product stream then exits the reactor vessel 22 through a plenum outlet 31 to a product line 33 for transport to product recovery. The plenum 44 may be disposed at the top of the reactor vessel 22 either inside the reactor vessel 22 as shown in FIG. 1 or above the reactor vessel 22.

Each cyclone 28 includes an upper cylindrical barrel section 46 contiguous with the entrance 41. The barrel section 46 is connected by a first funnel section 47 to a hopper section 48. The hopper section 48 is contiguous with a second funnel section 49 which is contiguous with a dip leg 50. Catalyst solids recovered by the cyclones 28 exit the bottom of the cyclone through dip legs 50. The dip legs 50 comprise conduits that may have one or more sections. The dip legs 50 extend downwardly in the reactor vessel 22. A suitable valve, such as a trickle valve or counterweight flapper valve, may be used on the outlet of the dip leg 50 to regulate catalyst flow. However, injection of an inert gas may be necessary to purge other gaps between piping in the reactor vessel 22.

The dip legs 50 deliver catalyst to the dense catalyst bed 29 in the disengaging chamber 34. Catalyst solids in the dense catalyst bed 29 enter the stripping section 38 which may be located in the disengaging chamber 34. Catalyst solids pass downwardly through and/or over a series of baffles 52, 53 in the stripping section 38. A stripping fluid, typically steam, enters a lower portion of the stripping section 38 through at least one distributor 35. Countercurrent contact of the catalyst with the stripping fluid over the baffles 52, 53 displaces product gases adsorbed on the catalyst as it continues downwardly through the stripping section 38. Stripped catalyst from the stripping section 38 may pass through a conduit 36 to a catalyst regenerator 14. In the regenerator, coke deposits are combusted from the surface of the catalyst by contact with an oxygen-containing gas at high temperature. Following regeneration, regenerated catalyst particles are delivered back to the bottom of the reactor conduit 20 through a conduit 18.

The catalyst-to-oil ratio, based on the weight of catalyst and feed hydrocarbons entering the bottom of the riser, may range up to 25:1 but is typically between about 4:1 and about 10:1. Hydrogen is not intentionally added to the riser. Steam may be passed into the riser to effect catalyst fluidization and feed dispersion. The average residence time of catalyst in the riser may be between about 0.5 and about 5 seconds. The type of catalyst employed in the process may be chosen from a variety of commercially available catalysts. A catalyst comprising a zeolite based material is preferred, but the older style amorphous catalyst may be used if desired. Y-type zeolite comprises the bulk of the FCC catalyst and an additive comprising MFI zeolite may also make up the FCC catalyst.

FIG. 1 depicts a regenerator 14 known as a combustor. However, other types of regenerators are suitable. In the catalyst regenerator 14, a stream of oxygen-containing gas, such as air, is introduced from a line 62 through an air distributor 64 to contact the spent catalyst in a first, lower chamber 60, combust coke deposited on the catalyst, and provide regenerated catalyst and flue gas. The catalyst regeneration process adds a substantial amount of heat to the catalyst, providing energy to offset the endothermic cracking reactions occurring in the riser 20. Catalyst and air flow upwardly together along a combustor riser located within the catalyst regenerator 14 and, after regeneration, are initially disengaged by discharge into an upper chamber 66 through a disengager 68. Finer separation of the regenerated catalyst and flue gas exiting the disengager 68 is achieved using first and second stage separator cyclones 69, 70, respectively, within the upper chamber 66 of the catalyst regenerator 14. Catalyst separated from flue gas dispenses through dip legs from cyclones 69, 70 while flue gas relatively lighter in catalyst sequentially exits cyclones 69, 70 and is discharged from the regenerator vessel 14 through a flue gas outlet 72 in a flue gas line.

Regenerated catalyst may be recycled back to the reactor 12 through the regenerator conduit 18. The riser 20 of the reactor 12 may be in downstream communication with the regenerator 14. As a result of the coke burning, the flue gas vapors exiting at the top of the catalyst regenerator 14 through the flue gas outlet 72 contain $SO_x$, $NO_x$, CO, $CO_2$, $N_2$, $O_2$ and $H_2O$, along with smaller amounts of other species.

We have discovered that coke deposits may form in the plenum 44. The coke deposits can occur with heavy feed, feed with high metal content, catalyst with low activity or poor feed vaporization, or when a coke precursor does not crack in the riser and condenses in the plenum 44, the plenum outlet 31 or product line 33 perhaps due to localized cooling from poor insulation or fluidization. Even locating the plenum 44 in the reactor vessel 22 to keep it hotter has not adequately prevented heavy coke growth. A refiner has to spend 4-8 days to clean the plenum every turnaround when coking in the plenum occurs.

It is proposed to diminish the low fluidization zones in the plenum 44 to prevent coke growth between adjacent gas conduits 42 and between gas conduits 42 and a side wall 43 of the plenum 44. Low fluidization zones may be isolated by use of a coke containment baffle 80 and activated by purging the low fluidization zone with a purge gas. Coke precursors will be prevented from entering the low fluidization zones to reduce the coke growth in the plenum. Reduction of approximately 80-90% of the volume of dead zones behind the gas conduits 42 may be achieved by this proposal.

In addition, we have discovered that purge gas continuously distributed adjacent to the plenum 44 in the reactor vessel 22 is normally cool, about 300° F. (149° C.), as compared to the temperature of the product vapors flowing in the reactor vessel 22, about 1000° F. (538° C.). The plenum 44 is therefore cooled by the purge gas and contact of a hot un-cracked vapor with a cooled plenum leads to the formation of coke deposits in the plenum. By minimizing the contact of the hot vapor against the plenum 44, coke deposits in the plenum will also be minimized.

Figure 2:
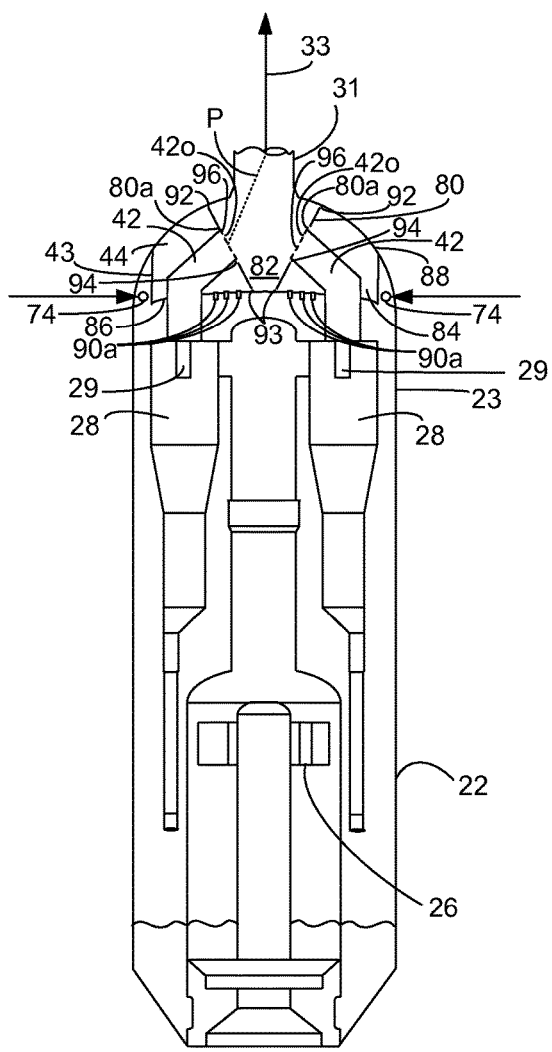
FIGS. 2 and 3 are enlarged alternative partial views of FIG. 1.
Figure 3:
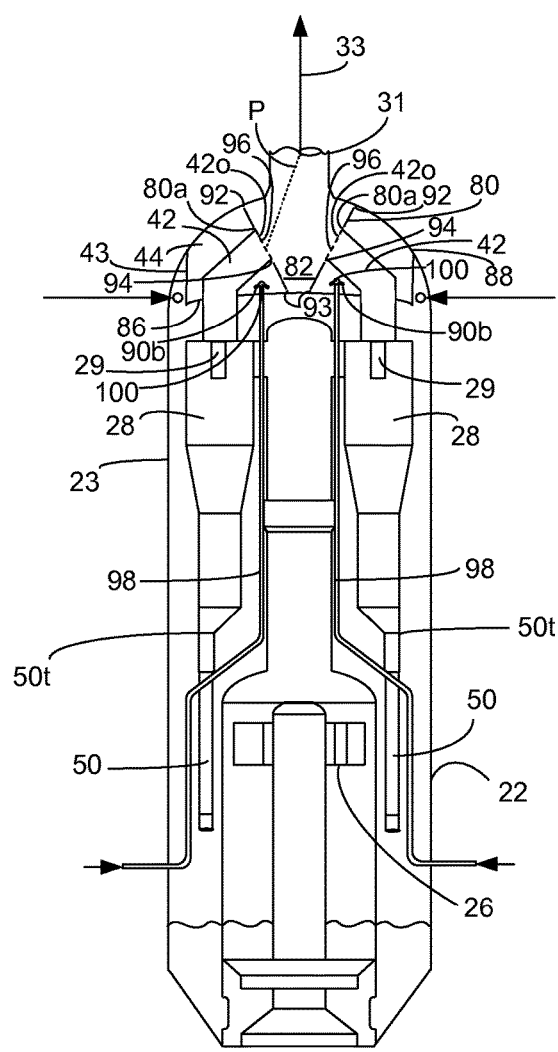

FIGS. 2 and 3 are partial views of FIG. 1 which show alternative embodiments of the present invention. FIGS. 2 and 3 show the baffle 80 in the plenum 44 that defines an inner volume 82 and an outer volume 84 within the plenum. The inner volume 82 is centrally located relative to the outer volume 84. The baffle 80 separates the outer volume 84 from the inner volume 82. The gas conduits 42 extend in the plenum 44 through the outer volume 84 to the baffle 80 and therefore to the inner volume 82. The baffle 80 may include apertures 80a to which the gas conduits 42 extend. An outlet 42o of each gas conduit 42 may be located inside the inner volume 80 or may be coterminous with the aperture 80a in the baffle 80. Product gas is removed from the cyclones 28 in respective gas conduits 42 into the inner volume 82 in the plenum 44. The plenum outlet 31 is contiguous with the inner volume 82. Product gas from the plenum 44 is discharged through the plenum outlet 31. In an aspect, the baffle 80 has an inverted frustoconical configuration such that the diameter of the frustum decreases from top to bottom. The baffle 80 may be made of metal and welded at points to the wall 23 of the reactor vessel 22, particularly to the upper head of the reactor vessel. Purge gas is distributed to the reactor vessel 22 through distributors 74 to push product gases from low fluidization regions in the reactor vessel 22 into the cyclones 28 through entrances 29 to prevent product gases from lingering with catalyst and over cracking or coking in the reactor vessel 22.

Perforated shields 96 may be provided on outlets 42o of the gas conduit 42 to prevent large solids such as detached coke deposits dislodged from an interior surface from entering the gas conduit from the plenum 44. Openings in the shields 96 allow gas to escape from the gas conduit 42 into the plenum 44. To ensure easy passage of gas from the inner volume 82 of the plenum 44 out of the plenum, an unobstructed straight line P is provided between the gas outlets 42o and the plenum outlet 31. No equipment is located between the gas outlets 42o and the plenum outlet 31. Hence, product gas may exit the gas conduit 44 and travel to the plenum outlet 31 in a straight line P.

The plenum 44 may be defined by the side wall 43, a bottom wall 86 and a top wall 88. The side wall 43 may be a cylindrical wall that provides horizontal containment. The bottom wall 86 and the top wall 88 provides vertical containment. The top wall 88 may share a top wall 23 or head of the reactor vessel 22 when the plenum 44 is contained in the reactor vessel 22. The bottom wall 86 may share a top wall or head of the reactor vessel 22 when the plenum 44 is located above the reactor vessel but this is not shown.

An upper edge of the baffle 80 may not extend all the way to the top wall 88 of the plenum 44 to provide gaps 92 and a bottom edge of the baffle 80 may not extend all the way to the bottom wall 86 of the plenum 44 to provide gaps 93. Additionally or alternatively, the edges of the baffle that define apertures 80a may also not extend to the surface of the gas conduits 42 to provide gaps 94 between the gas conduits 42 and the baffle 80. Gaps may be replaced by openings in the baffle 80, but the gaps allow tolerance for thermal expansion.

At least one purge gas inlet 90a, 90b allows an inert purge gas such as steam to enter the plenum 44 outside of the inner volume 82 in the outer volume 84. Gaps 92, 93, 94 allow purge gas to enter the inner volume 82 from the outer volume 84. Purge gas from purge gas inlet 90a, 90b is distributed into the outer volume 84 in the plenum outside of the inner volume 82. The purge gas passes from the outer volume 84 perhaps through the gaps 92, 93, 94 into the inner volume 82 to purge or push product gases from the outer volume 84 of the plenum 44 into the inner volume 82. The purge gas also urges product gases trying to enter the outer volume 84 from the inner volume 82 back into the inner volume. Consequently, the purge gas and product gases may quickly exit from the plenum 44 through the plenum outlet 31 to recovery in product line 33. The product gases exit from the gas conduits into an inner volume 82 of reduced volume, thereby speeding its exit from the plenum relative to a plenum without a baffle 80. Moreover, purge gas in the outer volume 84 will be at a higher pressure than in the inner volume 82 to prevent product gas from exiting the inner volume into the outer volume. Accordingly, the residence time of product gas in the plenum will be shortened.

In the embodiment of FIG. 2, openings in the bottom wall 86 of the plenum 44 outside of the inner volume 82 in the outer volume 84 provide purge gas inlets 90a for purge gas from the reactor vessel 22 to enter the plenum 44. The openings may be provided by tubular nozzles as shown in FIG. 2. Purge gas from the reactor vessel 22 that enters into the plenum is heated in the reactor vessel 22 before it is distributed into the outer volume 84, so as to mitigate coking which may be brought about by contact of product gas with cooler inert gas.

In the embodiment of FIG. 3, a purge gas conduit 98 extends through the reactor vessel 22 to a purge gas inlet 90b. A purge gas distributor 100 may be located at an outlet end of the purge gas conduit 98 in the outer volume 84 of the plenum 44 for providing a plurality of purge gas inlets 90b. The purge gas distributor 100 may be a T-pipe at the end of the purge gas conduit 98 with nozzles extending from the pipe. The nozzles may extend downwardly. The purge gas conduits 98 may deliver fluidizing gas out its outlet end without a distributor 100. An inert gas may feed the inlet end of the purge gas conduit 98 to be distributed or fed into the outer volume 84. In an aspect, the purge gas conduit 98 may enter a wall 23 of the reactor vessel 22 by piercing the wall 23 below a top 50t of the dip legs 50. By bringing the purge gas into the reactor vessel 22 at a lower level and transporting it through the purge gas conduit 98 in the reactor vessel 22 containing the cyclones 28, the purge gas is heated to prevent coking in the plenum 44.

The apparatus and process utilize a baffle 80 to create an inner volume 82 for the product vapors to prevent contact with a relatively cool plenum wall. The baffle 80 also limits the amount of the time the product vapors spend in the plenum 44 minimizing time for coke formation and limit product vapors from entering low fluidization zones.

SPECIFIC EMBODIMENTS

While the following is described in conjunction with specific embodiments, it will be understood that this description is intended to illustrate and not limit the scope of the preceding description and the appended claims.

A first embodiment of the invention is a process for separating catalyst from gas comprising separating catalyst from product gas in a cyclone; removing product gas from the cyclone in a gas conduit into an inner volume in a plenum; discharging the product gas from the plenum through a plenum outlet; and distributing a purge gas into an outer volume in the plenum outside of the inner volume to purge gas from an outer volume. An embodiment of the invention is one, any or all of prior embodiments in this paragraph up through the first embodiment in this paragraph further comprising heating the purge gas before distributing the purge gas. An embodiment of the invention is one, any or all of prior embodiments in this paragraph up through the first embodiment in this paragraph further comprising heating the purge gas by transporting it through a vessel containing the cyclone. An embodiment of the invention is one, any or all of prior embodiments in this paragraph up through the first embodiment in this paragraph wherein the purge gas is transported in a purge gas conduit through the vessel. An embodiment of the invention is one, any or all of prior embodiments in this paragraph up through the first embodiment in this paragraph further comprising passing the purge gas from the outer volume into the inner volume. An embodiment of the invention is one, any or all of prior embodiments in this paragraph up through the first embodiment in this paragraph further comprising passing the purge gas through gaps provided by edges of a baffle defining the inner volume. An embodiment of the invention is one, any or all of prior embodiments in this paragraph up through the first embodiment in this paragraph wherein the product gas may exit the gas conduit and travel to the plenum outlet in a straight line. An embodiment of the invention is one, any or all of prior embodiments in this paragraph up through the first embodiment in this paragraph further comprising contacting catalyst with hydrocarbon feed to produce product gas before the catalyst is separated from the product gas. An embodiment of the invention is one, any or all of prior embodiments in this paragraph up through the first embodiment in this paragraph wherein the outer volume is separated from the inner volume by a baffle.

A second embodiment of the invention is a process for separating catalyst from gas comprising separating catalyst from product gas in a cyclone; removing product gas from the cyclone in a gas conduit into an inner volume in a plenum; discharging the product gas from the plenum through a plenum outlet; heating a purge gas; distributing the purge gas into an outer volume in the plenum outside of the inner volume to purge gas from an outer volume. An embodiment of the invention is one, any or all of prior embodiments in this paragraph up through the second embodiment in this paragraph further comprising heating the purge gas by transporting it through a vessel containing the cyclone. An embodiment of the invention is one, any or all of prior embodiments in this paragraph up through the second embodiment in this paragraph wherein the purge gas is transported in a purge gas conduit through the vessel. An embodiment of the invention is one, any or all of prior embodiments in this paragraph up through the second embodiment in this paragraph further comprising passing the purge gas from the outer volume into the inner volume. An embodiment of the invention is one, any or all of prior embodiments in this paragraph up through the second embodiment in this paragraph further comprising passing the purge gas through gaps provided by edges of a baffle defining the inner volume. An embodiment of the invention is one, any or all of prior embodiments in this paragraph up through the second embodiment in this paragraph wherein the product gas may exit the gas conduit and travel to the plenum outlet in a straight line. An embodiment of the invention is one, any or all of prior embodiments in this paragraph up through the second embodiment in this paragraph further comprising contacting catalyst with hydrocarbon feed to produce product gas before the catalyst is separated from the product gas.

A third embodiment of the invention is a process for separating catalyst from gas comprising separating catalyst from product gas in a cyclone; removing product gas from the cyclone in a gas conduit into an inner volume in a plenum; discharging the product gas from the plenum through a plenum outlet; distributing a purge gas into an outer volume in the plenum outside of the inner volume to purge gas from an outer volume in the plenum; and passing the purge gas from the outer volume into the inner volume. An embodiment of the invention is one, any or all of prior embodiments in this paragraph up through the third embodiment in this paragraph further comprising heating the purge gas by transporting it through a vessel containing the cyclone before distributing the purge gas. An embodiment of the invention is one, any or all of prior embodiments in this paragraph up through the third embodiment in this paragraph wherein the outer volume is separated from the inner volume by a baffle and the purge gas is passed through gaps provided by edges of a baffle defining the inner volume. An embodiment of the invention is one, any or all of prior embodiments in this paragraph up through the third embodiment in this paragraph further comprising contacting catalyst with hydrocarbon feed to produce product gas before the catalyst is separated from the product gas.

A fourth embodiment of the invention is an apparatus for separating catalyst from gas comprising a vessel containing cyclones for separating catalyst from gas, the cyclones including a gas conduit for removing separated gas from the cyclone; a plenum at the top of the vessel with a plenum outlet for discharging gas from the plenum, the gas conduits extending into the plenum; a baffle in the plenum that defines an inner volume within the plenum, the gas conduit extending to the inner volume; a purge gas inlet in the plenum outside of the inner volume. An embodiment of the invention is one, any or all of prior embodiments in this paragraph up through the fourth embodiment in this paragraph wherein the plenum outlet is contiguous with the inner volume. An embodiment of the invention is one, any or all of prior embodiments in this paragraph up through the fourth embodiment in this paragraph further comprising a purge gas conduit extending through the vessel to the purge gas inlet. An embodiment of the invention is one, any or all of prior embodiments in this paragraph up through the fourth embodiment in this paragraph wherein the cyclones include dip legs for dispensing catalyst from the cyclone and the purge gas conduit enters the vessel below a top of the dip legs. An embodiment of the invention is one, any or all of prior embodiments in this paragraph up through the fourth embodiment in this paragraph wherein edges of the baffle does not extend all the way to walls of the plenum to provide purge gaps for purge gas to enter the inner volume. An embodiment of the invention is one, any or all of prior embodiments in this paragraph up through the fourth embodiment in this paragraph further comprising a purge gas distributor in the plenum for providing a plurality of purge gas inlets. An embodiment of the invention is one, any or all of prior embodiments in this paragraph up through the fourth embodiment in this paragraph further comprising openings in a bottom wall of the plenum outside of the inner volume to provide the purge gas inlets for purge gas from the vessel to enter the plenum. An embodiment of the invention is one, any or all of prior embodiments in this paragraph up through the fourth embodiment in this paragraph wherein the baffle has an inverted frustoconical configuration. An embodiment of the invention is one, any or all of prior embodiments in this paragraph up through the fourth embodiment in this paragraph wherein the gas conduit extends to the inner volume and edges of the baffle do not extend all the way to the gas conduit to provide a purge gap for purge gas to enter the inner volume. An embodiment of the invention is one, any or all of prior embodiments in this paragraph up through the fourth embodiment in this paragraph further comprising shields on an outlet of the gas conduit to prevent large solids from entering the gas conduit from the plenum but including openings for allowing gas to escape from the gas conduit into the plenum. An embodiment of the invention is one, any or all of prior embodiments in this paragraph up through the fourth embodiment in this paragraph further comprising an unobstructed path between an outlet of the gas conduit and the plenum outlet.

A fifth embodiment of the invention is an apparatus for separating catalyst from gas comprising a vessel containing cyclones for separating catalyst from gas, the cyclones including a gas conduit for removing separated gas from the cyclone; a plenum at the top of the vessel with a plenum outlet for discharging gas from the plenum, the gas conduits outlet extending into the plenum; a baffle in the plenum that defines an outer volume and an inner volume within the plenum, the gas conduit extending to the inner volume; a purge gas inlet in the outer volume. An embodiment of the invention is one, any or all of prior embodiments in this paragraph up through the fifth embodiment in this paragraph wherein the plenum outlet is contiguous with the inner volume. An embodiment of the invention is one, any or all of prior embodiments in this paragraph up through the fifth embodiment in this paragraph further comprising a purge gas conduit extending through the vessel to the purge gas inlet and the cyclones include dip legs for dispensing catalyst from the cyclone and the purge gas conduit enters the vessel below a top of the dip legs. An embodiment of the invention is one, any or all of prior embodiments in this paragraph up through the fifth embodiment in this paragraph wherein edges of the baffle do not extend all the way to walls of the plenum to provide purge gaps for purge gas to enter the inner volume from the outer volume. An embodiment of the invention is one, any or all of prior embodiments in this paragraph up through the fifth embodiment in this paragraph further comprising a purge gas distributor in the plenum for providing a plurality of purge gas inlets. An embodiment of the invention is one, any or all of prior embodiments in this paragraph up through the fifth embodiment in this paragraph further comprising openings in a bottom wall of the plenum in the outer volume to provide the purge gas inlets for purge gas from the vessel to enter the plenum.

A sixth embodiment of the invention is an apparatus for separating catalyst from gas comprising a vessel containing cyclones for separating catalyst from gas, the cyclones including a gas conduit for removing separated gas from the cyclone; a plenum at the top of the vessel with a plenum outlet for discharging gas from the plenum, the gas conduits extending into the plenum; a baffle in the plenum that defines an outer volume and an inner volume within the plenum, the gas conduit extending to the inner volume and edges of the baffle do not extend all the way to walls of the plenum to provide purge gaps for purge gas to enter the inner volume from the outer volume; a purge gas inlet in the outer volume. An embodiment of the invention is one, any or all of prior embodiments in this paragraph up through the sixth embodiment in this paragraph further comprising a purge gas conduit extending through the vessel to the purge gas inlet and the cyclones include dip legs for dispensing catalyst from the cyclone and the purge gas conduit enters the vessel below a top of the dip legs. An embodiment of the invention is one, any or all of prior embodiments in this paragraph up through the sixth embodiment in this paragraph wherein the baffle has an inverted frustoconical configuration.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A process for separating catalyst from gas comprising:
    separating catalyst from product gas in a cyclone;
    removing product gas from said cyclone in a gas conduit into an inner volume in a plenum;
    discharging said product gas from said plenum through a plenum outlet; and
    distributing a purge gas into an outer volume in said plenum separately from said product gas outside of said inner volume at a higher pressure than in the inner volume to purge gas from the outer volume.

2. The process of claim 1 further comprising heating said purge gas before distributing said purge gas.

3. The process of claim 2 further comprising heating said purge gas by transporting it through a vessel containing said cyclone.

4. The process of claim 3 wherein said purge gas is transported in a purge gas conduit through said vessel.

5. The process of claim 1 further comprising passing said purge gas from said outer volume into said inner volume.

6. The process of claim 5 further comprising passing said purge gas through gaps provided by edges of a baffle defining said inner volume.

7. The process of claim 1 wherein said product gas may exit said gas conduit and travel to said plenum outlet in a straight line.

8. The process of claim 1 further comprising contacting catalyst with hydrocarbon feed to produce product gas before said catalyst is separated from said product gas.

9. The process of claim 1 wherein said outer volume is separated from said inner volume by a baffle.

10. A process for separating catalyst from gas comprising:
    separating catalyst from product gas in a cyclone;
    removing product gas from said cyclone in a gas conduit into an inner volume in a plenum;
    discharging said product gas from said plenum through a plenum outlet;
    heating a purge gas;
    distributing said purge gas into an outer volume in said plenum separately from said product gas and outside of said inner volume to purge gas from an outer volume.

11. The process of claim 10 further comprising heating said purge gas by transporting it through a vessel containing said cyclone.

12. The process of claim 11 wherein said purge gas is transported in a purge gas conduit through said vessel.

13. The process of claim 10 further comprising passing said purge gas from said outer volume into said inner volume.

14. The process of claim 13 further comprising passing said purge gas through gaps provided by edges of a baffle defining said inner volume.

15. The process of claim 10 wherein said product gas may exit said gas conduit and travel to said plenum outlet in a straight line.

16. The process of claim 10 further comprising contacting catalyst with hydrocarbon feed to produce product gas before said catalyst is separated from said product gas.

17. A process for separating catalyst from gas comprising:
   separating catalyst from product gas in a cyclone;
   removing product gas from said cyclone in a gas conduit into an inner volume in a plenum, said gas conduit extending to said inner volume;
   discharging said product gas from said plenum through a plenum outlet;
   distributing a purge gas into an outer volume in said plenum separately from said product gas outside of said inner volume through a purge gas inlet in said outer volume to purge gas from an outer volume in said plenum; and
   passing said purge gas from said outer volume into said inner volume.

18. The process of claim 17 further comprising heating said purge gas by transporting it through a vessel containing said cyclone before distributing said purge gas.

19. The process of claim 17 wherein said outer volume is separated from said inner volume by a baffle and said purge gas is passed through gaps provided by edges of said baffle defining said inner volume.

20. The process of claim 17 further comprising contacting catalyst with hydrocarbon feed to produce product gas before said catalyst is separated from said product gas.

* * * * *